July 29, 1941.    J. W. ISEMAN    2,251,057
DENTAL TOOL
Filed May 2, 1940
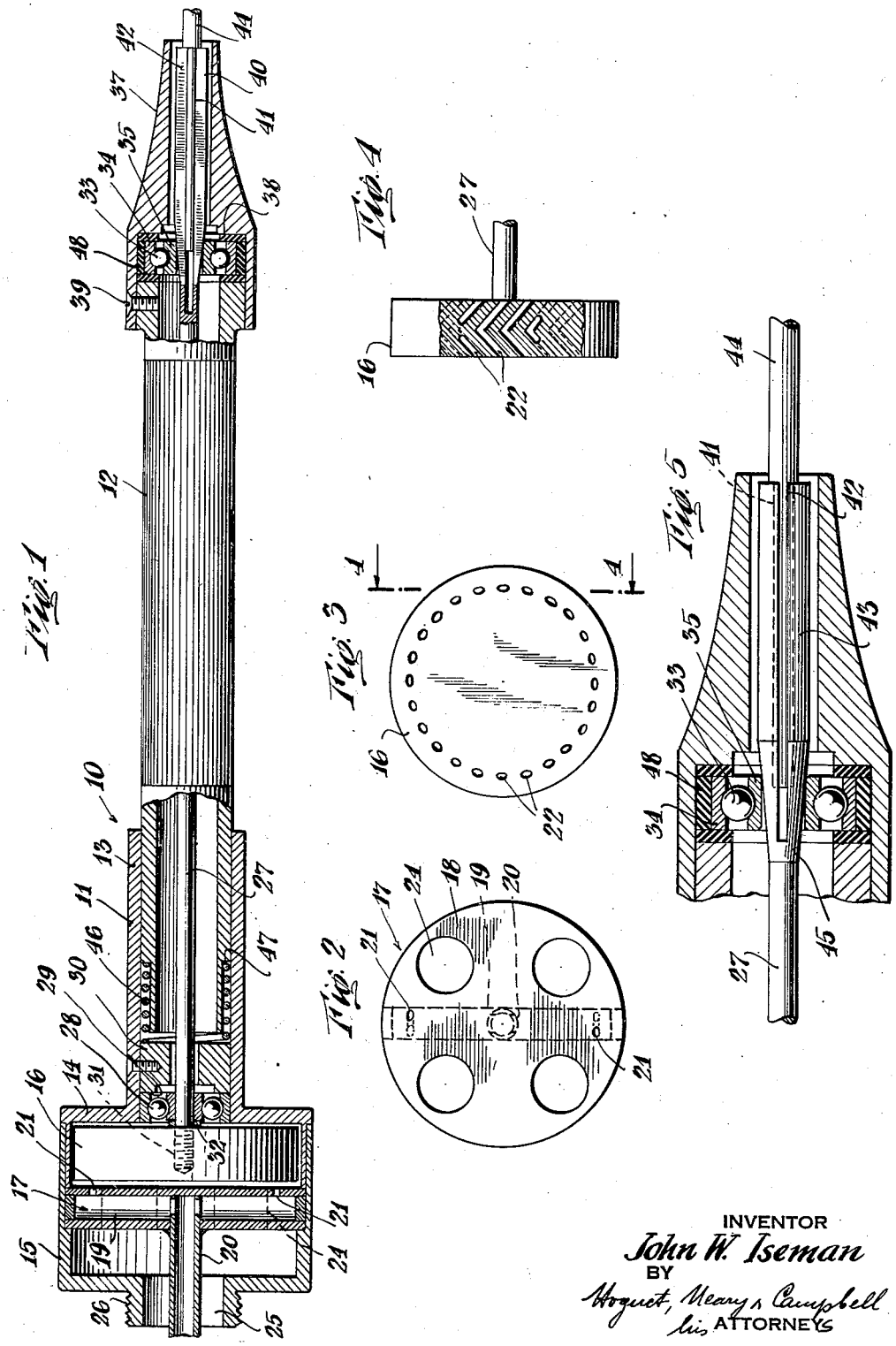
INVENTOR
*John W. Iseman*
BY
*Hoguet, Neary & Campbell*
his ATTORNEYS Patented July 29, 1941

2,251,057

UNITED STATES PATENT OFFICE 2,251,057

DENTAL TOOL

John W. Iseman, New York, N. Y., assignor to Modern Products, Inc., Wilmington, Del., a corporation of Delaware Application May 2, 1940, Serial No. 332,863

11 Claims. (Cl. 32—26)

This invention relates to dentistry, and more particularly relates to improvements in hand-pieces for holding dental tools, such as, for example, grinding burrs, drills, and polishing wheels which are commonly used in the practice of dentistry.

Many different kinds of dental hand-pieces are known in the art, all of these devices consisting essentially of a holder of elongated shape which the dentist may grip in manipulating the tool, a chuck within the holder for detachably receiving different types of grinding and cutting elements and either a source of power forming a part of the holder or suitable connections for receiving power from an external source to drive said chuck.

The most common power supply mechanism consists of a motor which through an articulated framework and a series of pulleys and belts drives the hand-piece which is carried on the end of the last element of the framework. Such power supply means are quite complicated and even though specifically intended to provide for flexibility of manipulation of the hand-piece, nevertheless are not as flexible and convenient to use as might be desired.

It has been suggested that the power supply itself could be placed upon the hand-piece and connected by a flexible member to a suitable source of energy, such as, for example, electrical power lines or a source of compressed fluid. Such devices, however, have not met with any favor in use and hence are not used at the present time, apparently for the reason that they have not been properly designed to provide the necessary power and speed for efficient cutting and grinding.

An object of the present invention is to overcome the disadvantages of the prior constructions by providing a simple dental hand-piece which is capable of high speed of operation and is actuated by a source of power forming a part of the hand-piece.

Another object of the invention is to provide a dental hand-piece which may readily be operated to release and grip a tool to be applied thereto and having a novel turbine form of driving mechanism for rotating the tool chuck.

Another object of the invention is to provide a simplified form of chuck for such dental hand-pieces which may be readily opened and closed to release or grip a dental tool by relative movement of elements forming the casing of the dental hand-piece.

Other objects of the invention will become apparent from the following description of a typical form of dental hand-piece embodying the invention.

In accordance with the present invention, I have provided a dental hand-piece including as a power source, a fluid-driven turbine which actuates a drive shaft having a chuck for receiving a dental tool, the whole being enclosed in casing elements which can be manipulated to brake the turbine and release the chuck to permit ready replacement of a different type of dental tool.

More particularly, the dental tool embodying the present invention is provided with anti-friction bearings, such as, for example, ball bearings, for supporting the shaft and the rotors of the turbine which forms the power source of the present device. One of the bearings is used in conjunction with chuck jaws on the shaft for closing and releasing the chuck jaws. The frictional engagement between the anti-friction bearing and the shaft is used to cause a movement of the rotor of the turbine relatively to a braking surface fixed to the casing in order to stop the rotation of the rotor when it is desired to change the tools in the chuck.

Devices of the type embodying the present invention are convenient to use because of the absence of flexible shaft or belt drives, and because of their relatively simple construction, are less expensive to manufacture and maintain in operation than are the forms of devices now commonly in use.

A compressor which is normally present in dental laboratories, forms a suitable source of power for the turbine.

Inasmuch as the turbine shaft and chuck are supported in anti-friction bearings, the device will operate at higher speed than hand-pieces of the type now commonly used. For example, at about 45 pounds gauge pressure, it has been found that the turbine rotor will revolve at about 25,000 R. P. M., as compared with about 6,000 R. P. M. in the conventional belt-driven type of hand-piece. This high speed of rotation reduces the amount of pressure that is required to effect cutting or grinding and, because of this reduced pressure, more delicate work can be done and the patient suffers less pain during the operation of the device.

For a better understanding of the present invention, reference may be had to the accompanying drawing in which:

Figure 1 is a side elevation of a typical form of dental hand-piece embodying the invention, partly broken away to show details of its construction;

Figure 2 is a plan view of the device utilized for injecting fluid for actuating the rotor of the drive turbine of the device;

Figure 3 is a plan view of the rotor of the turbine;

Figure 4 is a view in section taken on line 4—4 of the turbine rotor; and

Figure 5 is a view in section of the chuck for the dental hand-piece shown greatly enlarged in order to illustrate details of construction.

The form of the invention illustrated in Figure 1 of the drawing includes a casing 10 formed of two casing elements 11 and 12.

The casing element 11 includes a tubular sleeve element 13 having an enlarged cylindrical portion 14 at its left hand end as viewed in Figure 1. The enlarged cylindrical portion 14 of the casing is slidably received within a cylindrical cup-shaped element 15 which, when assembled with the element 14, forms a housing for a turbine rotor 16 and a fluid injecting element 17 which is held in position by a shoulder in the interior of the casing element 15 and the edge of the element 14.

The fluid injecting element 17, as best shown in Figure 2, may consist of a disk-like member 18 having a diametrically extending bore 19 which communicates with an axially extending hollow tube 20 fixed at the center of the disk. The ends of the transverse bore 19 are plugged so that the fluid delivered thereto through the tube 20 cannot escape from the ends of the bore. The base of the disk 17 is provided with one or more inclined passageways 21 through which the fluid under pressure is directed against the turbine rotor 16.

As best shown in Figures 3 and 4, the turbine rotor 16 is a disk-like element having a plurality of circularly arranged bores 22 adjacent its periphery which form the vanes of the rotor. The bores 22 are formed by drilling at an angle from opposite sides of the disk so that the bores will meet at an angle of about 90°. The V-shaped passageways formed thereby extend substantially tangentially of the circle in which they are located.

When the compressed fluid is directed into these bores 22, the fluid will travel substantially directly down the near branches of the bores until it strikes the end thereof providing one driving reaction, changing its direction and blowing out in the opposite direction from the bore, thereby providing another driving reaction. The turbine, therefore, is of the double action type.

The turbine rotor 16 fits loosely within the casing element 14 so that the exhaust fluid may escape around its periphery and back through a series of openings 24 in the injector disk 17 and thence to atmosphere through the opening 25 between the tube 20 and a collar 26 on the end of the housing element 15.

If desired, the collar may be provided with a flexible tube concentric with a fluid supplying conduit which is connected to tube 20, so as to carry the exhaust fluid away from the patient.

The turbine rotor 16 is mounted on the end of a drive shaft 27 which extends axially of the casing elements 11 and 12. The shaft 27 is supported at one end in a ball bearing 28 which is disposed in a cavity 29 in the casing 14 and rests against a shoulder formed by an inwardly projecting flange 30 in the casing.

The rotor 16 may be connected to the shaft 27 in any desired way, but preferably it is connected by means of screw threads 31 which are of such hand that rotation of the rotor 16 will tend to tighten it on the shaft 27.

The rotor 16 is limited in its movement in the direction of the bearing 28 by means of a collar 32 which engages the inner race of the bearing, thus producing a substantially frictionless thrust arrangement which prevents the rotor from engaging the wall of the casing 14.

The casing element 12 is slidably mounted in the tubular portion 13 of the casing 11 so that it can be withdrawn or moved axially relatively to the casing 11. The casing element 12 is a simple tubular member adapted to be gripped to manipulate the dental tool and may be suitably fluted in order to make it easier to grip.

At the free end of the casing element 12 is disposed a second roller bearing 33 which supports the outer end of the shaft 27. The roller bearing 33 is provided with an outer race 34 and an inner race 35 within which the shaft 27 is slidably supported. The bearing 33 is maintained in fixed position at the end of the casing element 12 by means of a cap or end piece 37 having a center bore for receiving the end of the shaft 27 and an enlarged bore providing a shoulder 38 which bears against the outer race 34 of the bearing 33 and retains it in position. The end piece 37 may be connected to the casing element 12 in any desired manner, such as for example, by screw threads or by a cap screw 39.

As best shown in Figure 5, the right hand end of the shaft 27 is provided with an enlarged portion 40 having a center bore 41 and a plurality of slots 42 therein to form chuck jaws 43 adapted to receive and grip the shank of a dental tool 44. The jaws 43 normally are spread apart a sufficient distance so that the tool may be readily inserted or removed.

I have utilized the inner race 35 of the ball bearing 33 as a gripping means to close the chuck jaws 43. In order to provide a wedging action, the inner portion of the outer surfaces of the chuck jaws 43 have been provided with a tapered or conical portion 45 having its largest diameter greater than the internal diameter of the race 35, so that when the shaft 27 is moved to the left, as viewed in Figure 5, relatively to the race 35, the jaws 43 will be compressed and the shank of the tool 44 gripped tightly therebetween. A taper of about 3° has been found to be most satisfactory, inasmuch as sufficient movement of the jaws 43 can be obtained and there is no tendency for the jaws to slide out of the race 35 with such a slight taper.

Movement of the shaft relatively to the ball race 35 is accomplished by means of the relative sliding movement of the housings 11 and 12. The ball bearing 33 is fixed relatively to the casing element 12, and movement of the casing elements 11 and 12 toward each other will cause the shaft 27 also to move to the left because of the frictional engagement of the inner race 35 with the tapered portion 45 of the shaft 27. This movement continues until the rotor 16 of the turbine strikes the face of the injector disk 17, thus holding the shaft against further endwise movement to the left. Continued movement of the casing element 12 to the left will then draw the ball bearing 33 to the left along the shaft and release the chuck jaws 43 so that they are opened by their inherent resiliency.

When the casing elements 11 and 12 are moved apart, the first effect is to cause the ball bearing 33 to engage the inclined portion 45 of the chuck jaws. The rotor 16 then is moved away from the injector disk 17 until the collar 32 engages the inner race of the bearing 28. This prevents further movement of the shaft to the right, and continued movement of the casing element 12 will then force the inner race of the bearing 35 along the tapered portion 45 of the chuck jaws 43 causing them to close or be compressed to grip the shaft of a tool therebetween.

It should be noted that when the rotor 16 is brought against the face of the injector disk 17, a braking effect is produced thereby quickly stopping the rotor, if it is revolving. This braking action is important inasmuch as when a device of this type is operated at pressures on the order of about 45 pounds gauge pressure, the rotor will revolve at the rate of about 25,000 R. P. M. If no braking mechanism were provided, it would take 10 to 15 seconds for the rotor to come to a stop, which obviously is an undesirably long time.

While, as illustrated, the turbine rotor 16 may be brought against the face of the injector disk 17, if desired, friction facings may be provided on the adjacent faces of these elements in order to minimize wear of the operating parts, or a braking surface may be projected inwardly from the housing 15 to engage the rim or other portion of the rotor upon relative movement of the casing elements 11 and 12.

It should also be noted that the shaft 27 constitutes the connection between the casing elements 11 and 12, so that upon removal of the turbine rotor 16, the casing elements 11 and 12 may be readily separated and, upon removal of the cap piece 37, the shaft may be readily withdrawn and the roller bearing 33 exposed for oiling and cleaning. However, inasmuch as anti-friction bearings are provided, oiling and cleaning of the device need take place only at rare intervals, thus conserving time and effort in keeping the device in proper operating condition. Moreover, external oiling apertures may be provided, if desired.

The turbine rotor 16 is maintained out of engagement with the injector disk 17, under normal operating conditions, by means of a spring 46 interposed between the flange 30 and the casing and a shoulder 47 adjacent the inner end of the casing element 12. This spring normally urges the roller bearing 33 and the chuck jaws 43 toward each other, thereby maintaining them in contact, but with insufficient force to normally close the chuck jaws 43. The spring prevents rattling of the parts and thus causes the device to operate more quietly.

The operation of the device may be rendered even more quiet by means of rubber mountings for the ball bearings 28 and 33. As illustrated in Figure 5, the outer race 34 of the bearing may be received in a channel-shaped rubber element 48 which absorbs vibration and the noise of the balls rolling in the races.

In operation, the hand-piece may be connected to a suitable supply of fluid under pressure, for example, compressed air furnished by an air compressor through a flexible conduit (not shown) which is connected to the tube 20 of the injector disk 17. A manually actuated valve may be located in the flexible conduit in order to admit the air into the injector disk 17. With the valve open, the air is injected through the injection openings 21 against the rotor, thereby causing the air to pass through the bores 22 in the rotor 16 and by the double action effect previously described, cause the rotor and the shaft 27 to revolve at high speed. The exhaust gas escapes around the periphery of the rotor through the apertures 24 in the injection disk and to atmosphere through the opening 25 or a tube connected thereto.

The chuck jaws 43 and the tool 44 rotate at high speed until the operation is terminated or it is desired to change tools. The valve in the gas supply line is then closed, the casing elements 11 and 12 moved together against the compression of the spring 46, thereby bringing the rotor into engagement with the injector disk 17, stopping the rotation of the chuck and moving the bearing 33 along the tapered portion 45 of the chuck jaws 43 to release the chuck jaws. A different tool is then placed in the chuck jaws, the casing elements 11 and 12 moved apart, withdrawing the rotor 16 from engagement with the injector disk 17 and forcing the inner race 35 of the bearing up the tapered portion 45 of the chuck, thereby gripping the tool. The spring 46 maintains the rotor out of engagement with the injector disk 17 and, upon opening of the valve, the rotor 16 is again driven.

From the above description of the device, it will be apparent that I have provided a simple, effective and completely self-contained dental hand-piece for operating dental tools, and that because of the compactness and simplicity of the device, it may be readily manipulated into all positions without restraint.

The power delivered by the device is controlled entirely by the pressure of the gas supply and the mass of the turbine rotor 16 which may be varied, as may be desired, to supply the amount of power required for driving the tool. Inasmuch, however, as the rotor is in itself of relatively small diameter, gyroscopic effects are reduced to a minimum, thereby rendering the device very easy to move in all directions and through all angles.

While only one form of the device has been described, it will be understood that it may be varied, as for example, by making the casing elements of a greater or lesser number than shown, and that the proportions of the device may be suitably altered as the purpose demands. Therefore, the form of the invention disclosed should be considered as illustrative and not as limiting the scope of the following claims.

I claim:

1. In a dental hand-piece the combination of a first casing element having an enlarged cylindrical portion, a second elongated casing element supported on said first casing element coaxially therewith and movable axially relatively thereof, a shaft extending axially of and rotatably mounted in said casing elements, and having an end disposed within said cylindrical portion, a turbine rotor supported on said end within said cylindrical portion, means in said cylindrical portion for directing fluid against said rotor to cause it to rotate said shaft and means responsive to relative axial movement of said casing elements for causing said rotor and said means for directing fluid against said rotor to engage to stop rotation of said rotor and said shaft.

2. In a dental hand-piece the combination of a pair of coaxial, relatively axially movable casing elements, a shaft having a chuck on one end thereof rotatably and axially shiftably mounted in said casing elements, a turbine rotor fixed to the other end of said shaft, means supported in one of said casing elements for directing fluid against said rotor to cause the rotor and shaft to rotate, means on the other casing element frictionally engageable with said chuck for opening and closing said chuck upon relative movement of said casing elements and responsive to relative movement of said casing elements for moving said rotor against said means for directing fluid to successively stop rotation of and open said chuck.

3. In a dental hand-piece the combination of a pair of coaxial, relatively axially movable casing elements, a shaft having chuck jaws on one end and a turbine rotor on the other end thereof rotatably mounted in antifriction bearings in said casing elements, means on one of said casing elements for directing fluid against said rotor to cause it to rotate, tapered portions on said chuck jaws engageable with one of said antifriction bearings in response to relative movement of said casing elements in one direction for causing said chuck jaws to move together for gripping a tool and braking means for stopping rotation of said rotor.

4. In a dental hand-piece, the combination of a pair of coaxial, relatively axially shiftable hollow casing elements, a turbine including a rotor and fluid injecting means mounted in one of said casing elements, a shaft for said rotor extending axially of said casing elements, chuck jaws on said shaft remote from said rotor and cooperating means on said chuck jaws and one of said casing elements responsive to relative axial movements of said casing elements for opening and closing said chuck jaws and for braking said rotor.

5. In a dental hand-piece, the combination of a shaft having chuck jaws at one end and a turbine rotor at the other, a casing enclosing said shaft and rotor, said rotor and shaft being shiftable axially relatively to said casing, means for directing fluid against said rotor to cause rotation of said rotor and shaft, braking surfaces associated with said means for directing fluid and said rotor, and means for shifting said rotor axially to cause said braking surfaces to engage.

6. In a dental hand-piece, the combination of a hollow casing, a shaft having chuck jaws and a turbine rotor thereon, rotatably supported and axially movable in said casing, means for directing fluid against said rotor to cause said shaft and rotor to revolve, braking surfaces on said rotor and in said casing and means for moving said rotor axially to cause said braking surfaces to engage.

7. In a dental hand-piece, the combination of a pair of coaxial, relatively axially shiftable casing elements, a ball bearing having inner and outer ball races mounted in each of said casing elements, a shaft shiftably supported in the inner races of said bearings, a turbine rotor on one end of said shaft, chuck jaws on the other end of said shaft, means for directing fluid against said rotor to cause rotation thereof, and at least one inclined surface on said chuck jaws frictionally engageable with the inner ball race of one of said ball bearings to compress said jaws inwardly when said casing elements are moved apart, said rotor and said inclined surface preventing separation of said casing elements, and resilient means normally urging said casing elements apart.

8. In a dental hand-piece, the combination of a casing element having a narrow tubular portion and a coaxial enlarged portion, an elongated tubular casing element having an end portion slidably supported in said narrow tubular portion and an opposite free end, a bearing adjacent said free end, means for retaining said bearing in fixed relation to said free end, a bearing in the first-mentioned casing element, a shaft rotatably supported in said bearings, a turbine rotor in said enlarged portion detachably connected to one end of said shaft, chuck jaws at the other end of said shaft, and an enlargement on said shaft outwardly of the bearing adjacent said free end of said elongated casing element, whereby said casing elements are limited in their relative axial sliding movement and are maintained against separation by said enlargement and said rotor.

9. The device set forth in the preceding claim including resilient means interposed between portions of said casing elements normally urging said casing elements apart.

10. The device set forth in claim 8 in which the enlargement on the shaft comprises a surface on at least one of said chuck jaws tapering inwardly toward said rotor and engageable with the antifriction bearing adjacent said free end of said elongated casing element to cause said jaws to close.

11. In a dental hand-piece, the combination of a pair of relatively movable hollow casing elements, a shaft rotatably mounted in said casing elements, a chuck on one end of said shaft, a turbine rotor on the other end of said shaft and disposed within one of said casing elements, means in the last-mentioned casing element for directing fluid against said rotor to rotate said shaft, and means responsive to relative movement of said casing elements for opening and closing said chuck.

JOHN W. ISEMAN.